Patented Mar. 16, 1948

2,437,711

UNITED STATES PATENT OFFICE 2,437,711

BETA-CYCLOHEXYLAMINOETHYL BENZ-HYDRYL ETHER AND SALTS THEREOF

George Rieveschl, Jr., Grosse Pointe Woods, Mich., assignor to Parke, Davis & Company, Detroit, Mich., a corporation of Michigan No Drawing. Application August 5, 1946, Serial No. 688,426

5 Claims. (Cl. 260—570)

This invention relates to amino ethers and to a method of obtaining the same. More particularly, the invention relates to β-cyclohexylaminoethyl benzhydryl ether and its acid addition salts. The free base of β-cyclohexylaminoethyl benzhydryl ether has the formula,

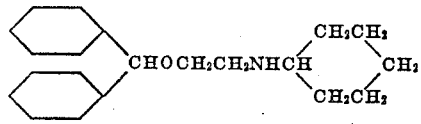

In accordance with the invention β-cyclohexylaminoethyl benzhydryl ether may be obtained as the free base having the formula given above or as an acid addition salt of the base with an inorganic or organic acid. Some examples of the salts which may be prepared by the methods hereinafter described are the hydrochloride, hydrobromide, hydroiodide, sulfate, phosphate, acetate, citrate, oxalate, succinate, benzoate, tartrate, phthalate, maleate, oleate and the like.

It has been found that β-cyclohexylaminoethyl benzhydryl ether may be prepared by the reaction of a β-haloethyl benzhydryl ether with cyclohexyl amine. The reaction can be carried out without a solvent or in a solvent such as alcohol, acetone, dioxane, ether, benzene, carbon tetrachloride and the like and may be effected by either allowing the reaction mixture to stand for one or two weeks or by heating the reaction mixture until no further cyclohexyl amine acid addition salt is formed. This usually requires heating the mixture for about twelve or more hours.

Another modification which can be made in this process involves the use of an alkaline material to react with the mineral acid formed during the reaction. When the reaction is carried out in the presence of such materials, a smaller quantity of amine is required since the amine is not removed from the reaction by salt formation. In general, when no acid-binding agent is used in the reaction it is preferable to use about two or more equivalents of amine to each equivalent of β-haloethyl benzhydryl ether but when an acid-binding agent is used this quantity can be reduced without materially altering the yield of the final product. Some of the alkaline substances which may be used in the process are alkali metal hydroxides, oxides, alcoholates, carbonates, bicarbonates, acetates and the like. The alkaline earth metal hydroxides, oxides and carbonates may also be employed.

The compounds of the present invention are powerful antispasmodics and exhibit antispasmodic activity five to six times greater than that of such well-known antispasmodics as papaverine. They are also useful as local anesthetics.

This application is a continuation-in-part of my copending application, Serial No. 531,639, filed April 18, 1944, now Patent No. 2,421,714, issued June 3, 1947.

The invention is illustrated by the following example.

Example.—β-Cyclohexylaminoethyl benzhydryl ether

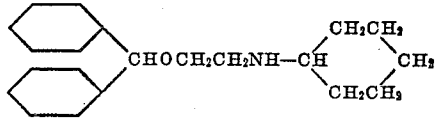

A mixture consisting of 29.1 g. of β-bromoethyl benzhydryl bromide and 96.8 g. of cyclohexylamine is heated on a steam bath for seventy hours. After ten minutes crystals of cyclohexylamine hydrobromide start to separate from the solution. After the reaction is complete the excess cyclohexylamine is distilled off and the residue treated with 300 cc. of water and 300 cc. of ether. The layers are separated and the ether layer washed with several additional portions of water. The ether layer is extracted with dilute hydrochloric acid and the free base liberated from the acidic solution by the addition of 10% sodium hydroxide solution. The base is extracted with ether, the ether solution dried and the ether evaporated. The residue which consists of the crude free base of β-cyclohexylaminoethyl benzhydryl ether may be converted directly to an acid addition salt as described below or it may be purified by distillation in vacuo; B. P. 186–98° C./1 mm.

10 g. of the crude free base is added slowly with stirring to a warm solution of 4.3 g. of oxalic acid dihydrate dissolved in 26 cc. of isopropanol. On cooling the mixture, the acid oxalate salt of β-cyclohexylaminoethyl benzhydryl ether separates as a white crystalline solid. It is collected and purified by recrystallization from isopropanol.

12 g. of the distilled free base is dissolved in a small amount of ether and the resultant solution treated with an excess of alcoholic hydrogen chloride. The hydrochloride salt which separates is collected and purified by recrystallization from absolute ethanol-petroleum ether mixture; M. P. 168–9° C.

Other salts of β-cyclohexylaminoethyl benzhydryl ether may be obtained in a similar manner, e. g. by treating an alcoholic or ether solution of the free base with an alcoholic or ether solution of the appropriate acid.

The β-halogen ethyl ethers used as starting materials in the preparation of the compounds of the present invention may be prepared by the method described for the preparation of β-bromoethyl benzhydryl ether.

494 g. of benzhydryl bromide, 206 g. of anhydrous sodium carbonate and 313 g. of ethylene bromohydrin are heated and stirred at 120 to 130° C. for eight hours. Carbon dioxide is evolved during the reaction. 500 cc. of benzene is added with stirring, the precipitate filtered off and washed with benzene. The benzene is removed by distillation and the β-bromoethyl benzhydryl ether distilled in vacuo; B. P. 169–72° C./2 mm.

Attention is called to the fact that compounds somewhat related to those claimed herein are described and claimed in my copending applications as follows: Serial No. 531,639, filed April 18, 1944, now Patent No. 2,421,714, issued June 3, 1947; Serial No. 640,685, filed January 11, 1946; Serial No. 640,686, filed January 11, 1946; Serial No. 640,687, filed January 11, 1946; Serial No. 660,406, filed April 8, 1946; Serial No. 688,424, filed August 5, 1946; Serial No. 688,425, filed August 5, 1946; Serial No. 688,427, filed August 5, 1946; Serial No. 739,985, filed April 8, 1947, now Patent No. 2,427,878, issued September 23, 1947; Serial No. 751,983, filed June 2, 1947; Serial No. 751,984, filed June 2, 1947; Serial No. 751,985, filed June 2, 1947; and Serial No. 780,099, filed October 15, 1947. Other copending applications describing and claiming certain novel processes for the preparation of the compounds herein claimed and others somewhat related thereto are as follows: Serial Nos. 688,420, 688,421, 688,422 and 688,423, all filed August 5, 1946.

What I claim as my invention is:

1. A compound of the class consisting of a free base and its acid addition salts, said free base having the formula,

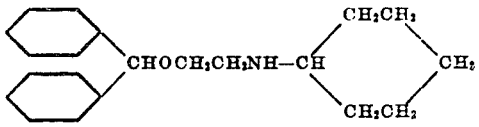

2. β-Cyclohexylaminoethyl benzhydryl ether.
3. β-Cyclohexylaminoethyl benzhydryl ether hydrochloride.
4. β-Cyclohexylaminoethyl benzhydryl ether acid oxalate.
5. Process for obtaining β-cyclohexylaminoethyl benzhydryl ether which comprises reacting a β-haloethyl benzhydryl ether with cyclohexyl amine.

GEORGE RIEVESCHL, Jr.